Figure 1:
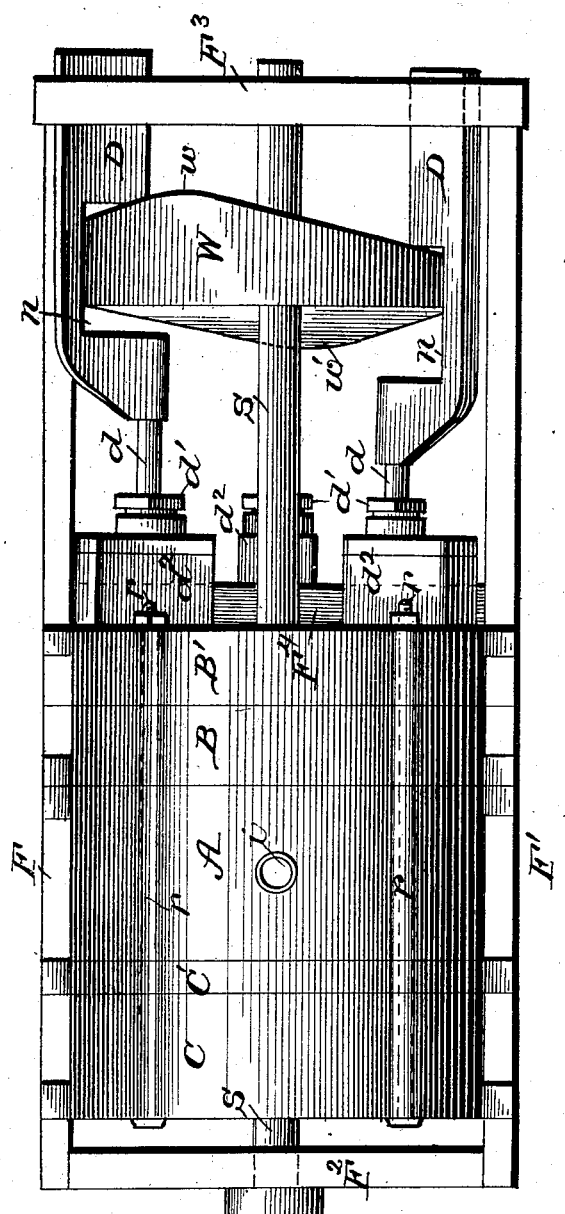

No. 750,188. PATENTED JAN. 19, 1904.
W. S. CHAPMAN, DEC'D.
C. A. HASTINGS, ADMINISTRATOR.
ROTARY ENGINE.
APPLICATION FILED OCT. 26, 1903.
NO MODEL. 4 SHEETS—SHEET 1.

WITNESSES:
Jos. A. Ryan
Edw. W. Byrn.

Inventor:
Charles A. Hastings
Administrator of Estate of
William S. Chapman
deceased
BY Munn & Co.
ATTORNEYS.

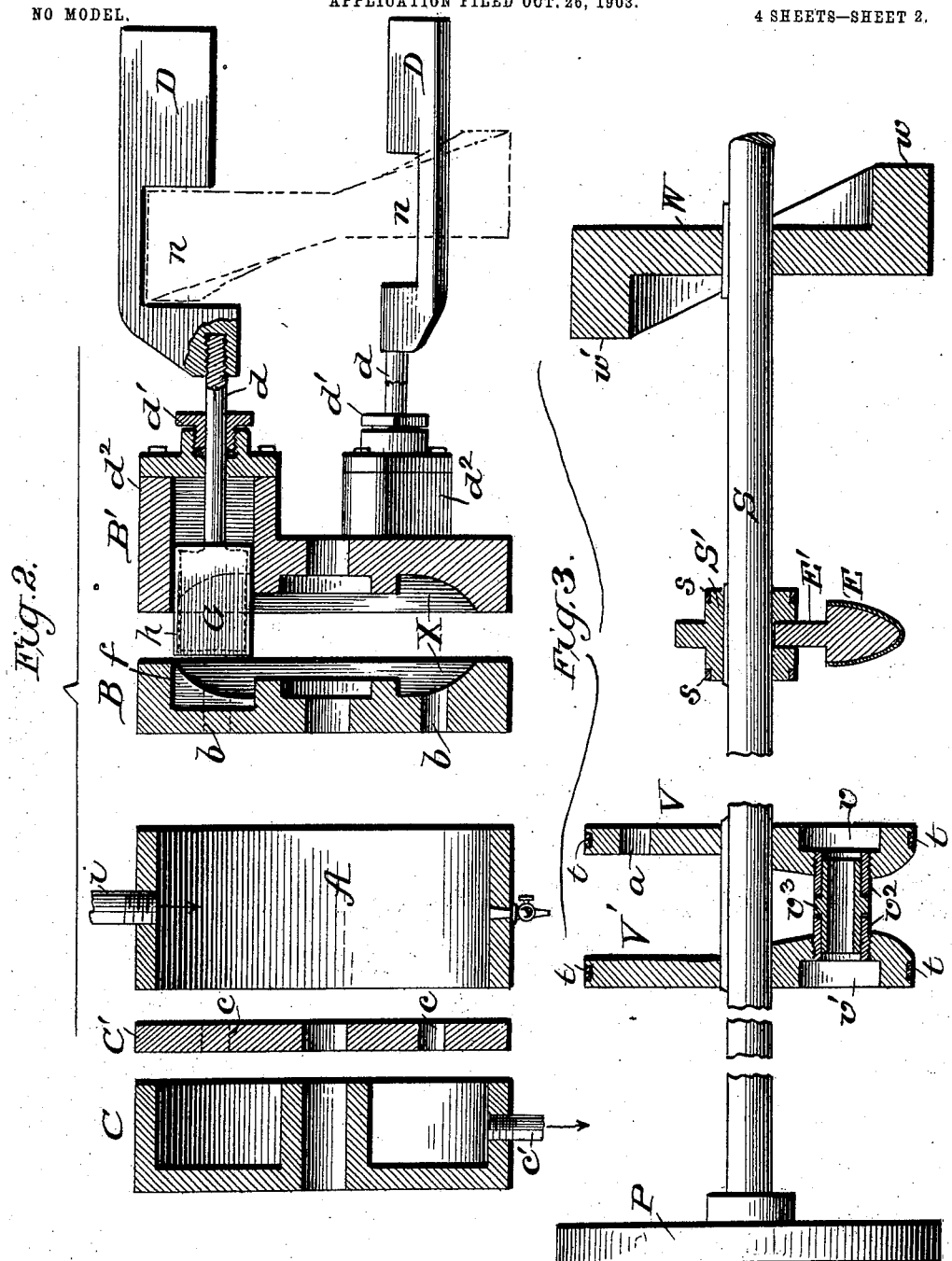

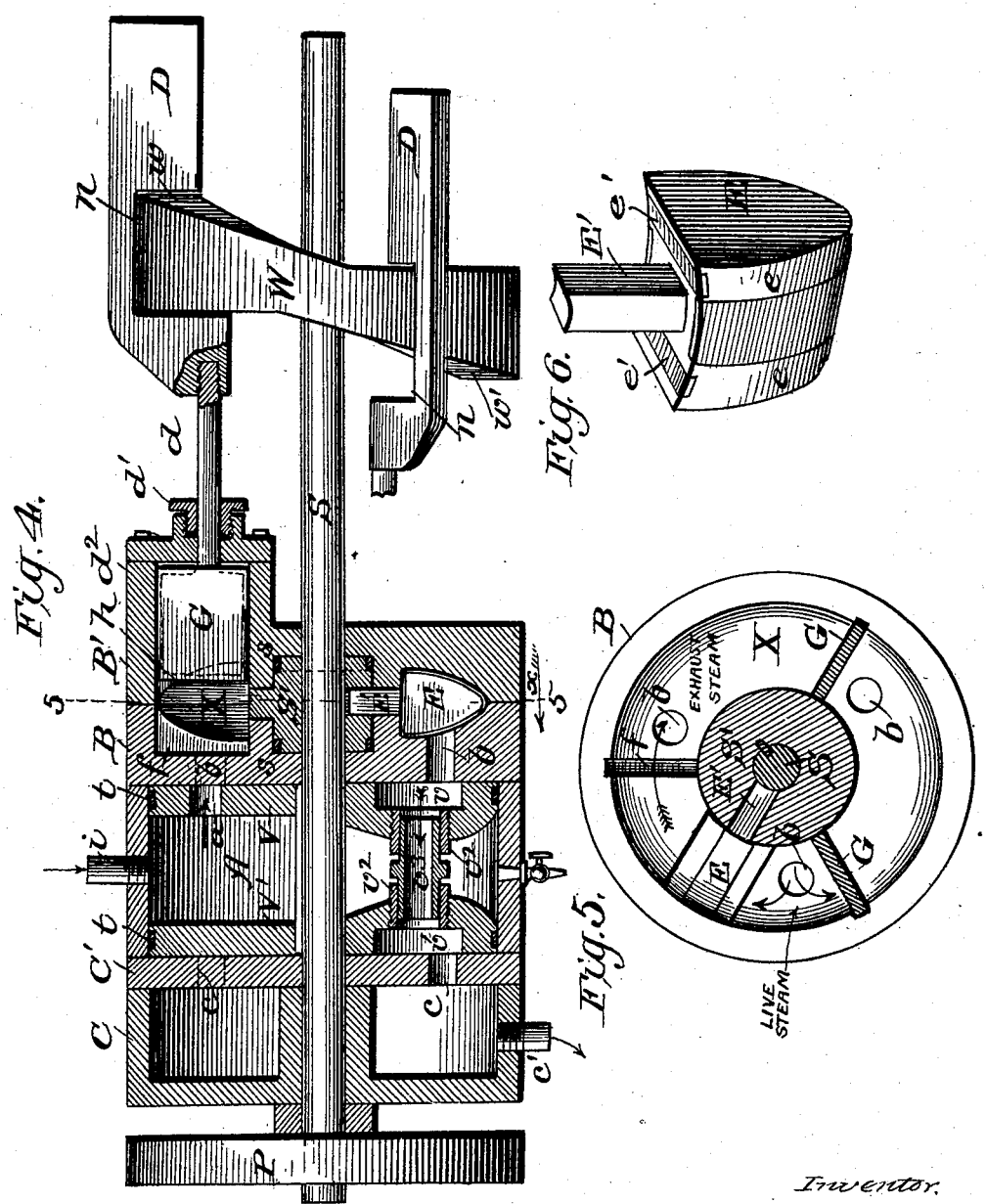

No. 750,188. PATENTED JAN. 19, 1904.
W. S. CHAPMAN, DEC'D.
C. A. HASTINGS, ADMINISTRATOR.
ROTARY ENGINE.
APPLICATION FILED OCT. 26, 1903.
NO MODEL. 4 SHEETS—SHEET 4.
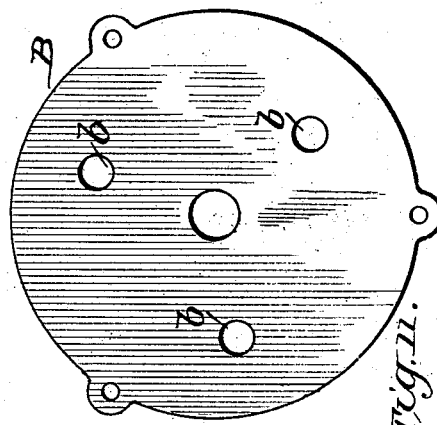
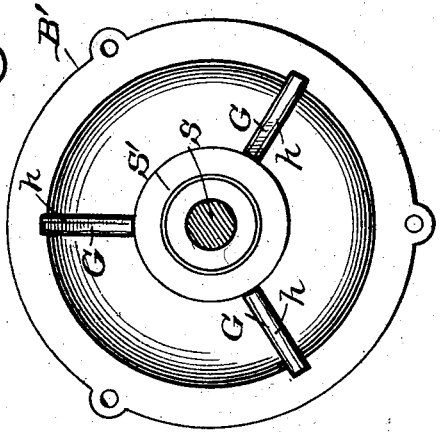
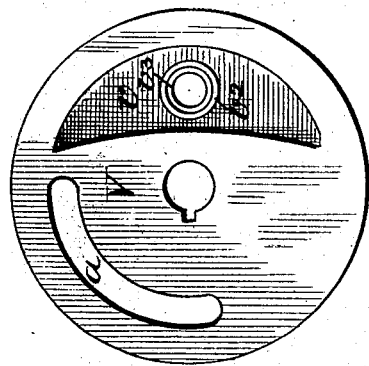
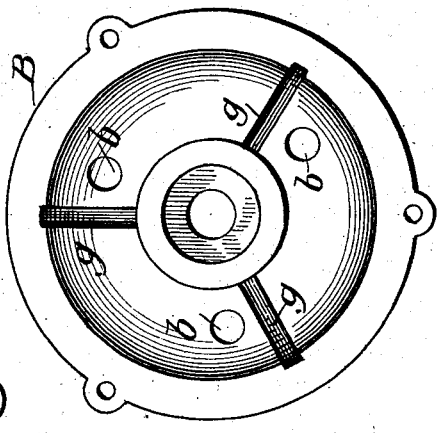
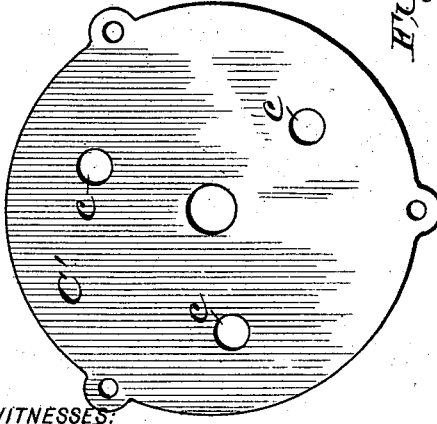
WITNESSES:
Jos. A. Ryan
Edw. W. Byrn
Inventor.
Charles A. Hastings
Administrator of Estate of
William S. Chapman
deceased
BY Munn & Co.
ATTORNEYS.

No. 750,188.  
Patented January 19, 1904.

UNITED STATES PATENT OFFICE.

CHARLES A. HASTINGS, OF LEWISTON, IDAHO, ADMINISTRATOR OF WILLIAM S. CHAPMAN, DECEASED, ASSIGNOR OF ONE-HALF TO ERICK ERICKSON AND ALBERT H. PETERSON, OF KIPPEN, IDAHO.

ROTARY ENGINE.

SPECIFICATION forming part of Letters Patent No. 750,188, dated January 19, 1904.

Application filed October 26, 1903. Serial No. 178,618. (No model.)

*To all whom it may concern:*

Be it known that WILLIAM S. CHAPMAN, deceased, late of Kippen, in the county of Nez Perces and State of Idaho, did invent a new and useful Improvement in Rotary Engines, of which the following is a specification.

The invention relates to rotary steam-engines of that class in which a rotary piston carried by a shaft turns inside of a stationary casing and is provided with movable abutments which are projected into the casing behind the piston to form a closed chamber for live steam, which presses on one side against the relatively stationary abutment and on the other side against the rotating piston, the abutment being arranged and timed to pass in and out to successively form the live-steam chamber behind the piston and then move out of the way to let the piston pass when it comes around to this abutment again.

The invention consists in the novel construction and arrangement of parts hereinafter described designed to form a rotary engine of high efficiency adapted to operate with steam at a high pressure of three hundred pounds, more or less, and in which the steam exerts a steady pressure with little or no back pressure and a great economy of steam.

Figure 1 is a top plan view of the entire engine. Fig. 2 is a sectional view of the parts of the stationary casing separated from each other and showing also the movable abutments and means for operating them. Fig. 3 is a sectional view of the rotating parts, which are keyed fast to the shaft and which are designed to fit inside the casing shown in Fig. 2. Fig. 4 is a sectional view of the parts shown in Figs. 2 and 3, the stationary casing and the rotating shaft and its moving parts being assembled in working position. Fig. 5 is a vertical transverse section on line 5 5 of Fig. 4 looking in the direction of the arrow $x$. Fig. 6 is a detail view in perspective of the revolving piston. Figs. 7 and 9 are inside face views of the opposite sides of the steam-chest. Fig. 8 is a face view of the rotating valve turning with the shaft in the steam-chest, and Figs. 10 and 11 are inside face views of the the two sides of the working steam-chamber in which the piston revolves.

Referring to Fig. 1, F F' F² F³ represent a rectangular stationary framework forming the bed of the engine, in which is supported the stationary main casing. This casing is made in several sections of a generally cylindrical character. A is the steam-chest section, which is provided with an inlet-steam pipe $i$. B B' represent the working cylinder-section, made in two halves, and C C' is the exhaust-steam chamber made in two parts. All these sections are firmly bolted together by long bolts $r$, arranged longitudinally to the casing. S is the main shaft journaled in bearings in the end pieces F² F³ of the main frame and also in a cross-bar F⁴. On this main shaft is rigidly keyed the double cam-wheel W, which works in notches $n$ in the abutment-slides D, whose stems $d$ enter stuffing-boxes $d'$ and connect with the sliding abutments which play in the chambers $d^2$ and coöperate with the piston inside the working steam-chamber B B', as hereinafter described. P is a pulley on the main shaft, from which the power of the engine is taken off by a belt to any suitable point.

Referring now to Figs. 2, 3, and 4, which best show the internal construction of the stationary steam-casing and its working parts, the steam-chest A receives its steam through the inlet-pipe $i$ and passes it to the right into the piston-chamber B B', and when the steam has done its work in the piston-chamber the exhaust-steam is brought back again through the steam-chest and is discharged into the exhaust-steam chamber C C'. (Shown on the left of Fig. 2.) This passage of the steam in opposite directions through the steam-chest is effected by a special double-acting valve V V'. (Seen in Fig. 3.) This valve consists of two disks V V', which have in their outer faces pockets $v$ and $v'$, which are connected together by thimbles $v^2$ $v^2$, and an intermediate telescopic tube-section $v^3$, connecting the two thimbles. The valve-section V also has an opening $a$ through it which gives passage to the steam from the steam-chest to the working steam-chamber. This opening is in the shape of a curved slot, as seen in Fig. 8, which shows a side view of this section of the valve.

Referring now to Fig. 4, it will be seen that on the left of the valve V V' there is a partition-disk C', that separates the valve from the exhaust-steam chamber C, and this partition-disk has three holes $c\ c\ c$ through it, as seen in Fig. 7, spaced equidistant from each other and at the same distance from the center. On the right-hand side of the valve-section V there are formed in the steam-chamber section B a similar set of three holes $b\ b\ b$, corresponding to holes $c$ in size, position, and distance from the center, as seen in Figs. 9 and 10.

Now (see Fig. 4) when the shaft S turns and carries the double-acting valve V V' with it the following induction and exhaust of steam through the valve takes place, viz: When the curved opening $a$ of valve-section V is opposite any one of the openings $b$, then live steam passes from the inlet-pipe $i$ through steam-chest A and thence by registering openings $a$ and $b$ into the working steam-chamber B B', in which the piston revolves, as hereinafter described. As the valve rotates the two pockets $v$ $v'$ and communicating tube $v^3$ connect the two openings $b\ c$ on the opposite side of the valve and allow the exhaust-steam from the piston-chamber B B' to pass out opening $b$ and through the pockets and tube $v\ v^3\ v'$ of the valve to the opening $c$ on the other side into the exhaust-steam chamber C, and thence out the exhaust-steam pipe $c'$. It will thus be seen that by the peculiar construction and arrangement of the steam-chest between the working steam-cylinder and the exhaust-steam cylinder and the rotary double-acting valve both the live steam and exhaust-steam are carried through the steam-chest, the one in the opposite direction to the other. This construction of valve with the telescopic sliding tube $v^3$ always maintains a steam-tight joint, as the sliding or telescopic character of tube $v^3$ allows the two sections V V' of the valve to have a slight motion away from each other along the longitudinal axis of the shaft, so that the live-steam pressure within the steam-chest presses the valve-section V up against the ports $b$ in the piston-chamber and also presses the valve-section V' up against the ports $c$ of the exhaust-steam chamber. As the valve V V' rotates live steam is passed through the slot $a$ successively through the three inlet-ports $b$ and exhaust-steam is successively discharged through the three pairs of alined ports $b$ and $c$ as they are successively connected in pairs by the pockets and telescopic tube $v^3$ of the valve.

Having thus described the introduction and exhaust of the steam, I will now proceed to describe the construction and operation of the working steam-chamber and its piston and abutments.

The working steam-chamber is, as before stated, made in two parts B and B', which are hollowed out on their adjacent faces to form ring-shape grooves, which when placed together form the somewhat heart-shaped annular chamber X, in which closely fits a piston E (see Fig. 6) of corresponding shape. This piston has a rigidly-attached stem E' extending from its broader inner end into a recess or seat formed in a central hub S', which is rigidly connected to the shaft, as seen in Fig. 5, so that when the piston E revolves in the ring-shape chamber it carries the hub S' and shaft S with it. As the shaft rotates the rigidly-attached valve V V' also rotates and in proper order secures the introduction and exhaust of steam through ports $b$, as hereinafter described.

Disposed at equal distances from each other there are formed on the side of the working-steam-chamber section B three chambers $d^2$, in which work the sliding abutments G, which connect with rods $d$, that extend through stuffing-boxes $d'$ and are screwed into the abutment-slides D, operated by cam-wheel W. The outer ends of these slides are guided in the end frame $F^3$. The abutments G are flat plates disposed radially at equidistant points around the steam-chamber and are arranged to be drawn back into the chambers $d^2$ to let the piston pass or be projected squarely across the ring-shaped steam-chamber to divide it into separate compartments. To receive the ends of the sliding abutments G, there are pockets $f\ f\ f$ formed in the section B of the steam-chamber, which are exactly opposite the sliding abutments. The hub S' (see Fig. 4) is fitted with packing-rings $s\ s$ to make steam-tight joints, and the piston E has also packing-rings $e$ and $e'$ (see Fig. 6) for the same purpose, and the sliding abutments have also packing around their edges, as shown at $h$, to render them steam-tight, and similar packing-rings $t\ t$ are placed on the peripheries of the valve-sections.

It will be understood that the cam-wheel W has oppositely-projecting flanges $w$ and $w'$, which play in the notches $n$ of the abutment-slides, and as the cam-wheel revolves it imparts successively to the abutments G a motion back and forth across the ring-shaped steam-chamber that is so timed as to properly regulate the introduction and exhaust of steam. This can best be understood from Fig. 5. Assuming that the left-hand abutment G is fully across the ring-shaped steam-chamber and completely dividing the same and that live steam is now coming in at the left-hand port $b$, as shown by the two small arrows, then the steam presses against the relatively stationary abutments G as it would against the ordinary head of a steam-cylinder and exerts its full pressure against the moving piston E to force it around. At this time the upper abutment is out of the upper pocket $f$, and the exhaust-steam which is on this side of the piston is passing out the upper port $b$, as shown by the large single arrow, and through the valve and steam-chest, as before described. When the piston E gets past the upper pocket $f$, the abutment for this pocket is pushed by the cam-wheel across the steam-chamber and into this pocket behind the piston, and then live steam comes in the upper port $b$ and exerts its pressure between this abutment and the piston to continue its motion around the shaft. The exhaust-steam is now discharged through the next port $b$ in advance by the withdrawal of the abutment G next in advance. It will thus be seen that live steam is introduced three times in a complete revolution of the piston, and steam is also exhausted at three points around the full circle of revolution, which gives the full power of the steam with the least back pressure.

Having thus described the invention, what I claim as the new invention of the said WILLIAM S. CHAPMAN, deceased, and desire to secure by Letters Patent, is—

1. A rotary steam-engine comprising a central steam-chest, an exhaust-chamber arranged on one side of said steam-chest, a piston-chamber arranged on the other side of the steam-chest, and a shaft passing through said chambers and carrying a piston in the working steam-chamber, and a rotary double-acting valve in the steam-chest controlling both the induction and exhaust of steam substantially as described.

2. A rotary steam-engine comprising a central steam-chest, an exhaust-chamber arranged on one side of said steam-chest, a piston-chamber with revolving piston arranged on the other side of the steam-chest, and a rotary double-acting valve arranged in the steam-chest and consisting of two disks with connected pockets in their outer faces, said disks being provided with a sliding coupling for the pockets, to permit the disks to be pressed away from each other, and one of said disks having an induction-port for the working steam-chamber substantially as described.

3. A rotary steam-engine having a working steam-chamber and rotary piston at one end, an exhaust-chamber at the other end, a steam-chest in the middle, and a shaft connected to the piston and extending through the steam-chest and bearing a rotary valve in the steam-chest having ports adapted to communicate with the working chamber and exhaust-chamber to secure the passage of live and exhaust steam through the steam-chest in opposite directions substantially as described.

4. A rotary steam-engine having a working steam-chamber with a ring-shaped steam-space and a piston revolving therein, said steam-chamber having casings containing sliding abutments on one side, and having on the other side pockets to receive the ends of sliding abutments and also ports opening laterally into the steam-space, a rotary valve outside these ports constructed and arranged to successively introduce and exhaust steam through these same ports substantially as described.

5. A rotary steam-engine comprising a ring-shaped steam-chamber with revolving piston, sliding abutments for the chamber and ports opening sidewise from the steam-chambers corresponding in number to the sliding abutments, a steam-chest arranged beside the working steam-chamber, an exhaust-chamber arranged beyond the steam-chest and having exhaust-ports through its sides corresponding to the ports of the working steam-chamber, a rotary valve fitting the steam-chest and having an elongated inlet-port and a through inlet passage-way for steam registering with the ports of the working steam-chamber and exhaust-steam chamber, and sliding abutments arranged to divide the steam-chamber as decribed.

6. A rotary steam-engine comprising a working steam-chamber, a steam-chest, and an exhaust-chamber arranged side by side with the steam-chest in the middle, bolts connecting the said parts, a shaft passing through the same and carrying a rigidly-attached valve in the steam-chest, a piston in the working chamber and a cam-wheel, an inclosing frame with bearings for the shaft, movable abutments for dividing the steam-chamber having operating-slides with notches embracing the cam-wheel, and guides for the outer ends of these slides substantially as and for the purpose described.

CHARLES A. HASTINGS,
*Administrator of the estate of William S. Chapman, deceased.*

Witnesses:
   ISHAM N. SMITH,
   AUGUST F. BROO.